Patented Nov. 17, 1931

1,832,247

UNITED STATES PATENT OFFICE

HANS SCHINDHELM, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

2-HALOGENO-5-NITRO-BENZENE-1.4-DICARBOXYLIC ACIDS AND PROCESS OF MAKING SAME

No Drawing. Application filed November 9, 1928, Serial No. 318,315, and in Germany November 11, 1927.

The present invention relates to 2-halogeno-5-nitrobenzene-1.4-dicarboxylic acids and to a process of making the same.

I have found that nitro-halogen-terephthalic acids are easily obtained by treating mono-halogen-terephthalic acids with a nitrating agent. This is a surprising fact since terephthalic acid itself could hitherto be nitrated only under very extreme conditions, for instance, by means of a great excess of fuming nitric acid and a great quantity of fuming sulfuric acid (Berichte der deutsch. chem. Gesellschaft, vol. 10, page 145; Liebig's Annalen, vol. 121, page 90; Chem. Zentralblatt 1912, Vol. I, page 1711).

My process is carried out with an especially favorable result by acting with a mixture of nitric and sulfuric acid on a mono-halogen-terephthalic acid dissolved in sulfuric acid.

The new 2-halogeno-5-nitrobenzene-1.4-dicarboxylic acids, which are easily obtainable by my process, correspond to the formula

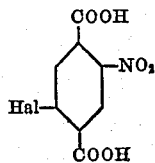

They are very reactive compounds. For instance they yield with the aid of a reducing agent 2-halogeno-5-aminobenzene-1.4-dicarboxylic acids. The nitro-compounds as well as the reduction products may be employed as starting materials for the production of dyestuffs and of pharmaceutical products.

In order to further illustrate my invention the following examples are given, the parts being by weight and all temperatures in Centrigrade degrees, but I wish it to be understood that I am not limited to the particular products or reaction conditions mentioned therein.

Example 1

40 parts of mono-chloro-terephthalic acid (obtainable by treating 1.4-dimethyl-2-chloro-benzene with chlorine while exposed to light and saponifying a chloro-terephthalic hexachloride thus formed; see Example 1 of U. S. application Serial No. 318,314, filed November 9, 1928) are dissolved at about 90° in 200 parts of sulfuric acid of 66° Bé. The mass is cooled to room temperature. Then 28 parts of a mixture of nitric and sulfuric acid containing 50% of $HNO_3$ are quickly dropped in, while well stirring. The temperature arises to about 65°, the reaction mixture becoming a clear solution. After stirring for still a short time, the solution is allowed to cool. At about 50° the new nitro-compound separates in a crystalline form. It is isolated by introducing the reaction mass into ice. The precipitate thus formed is filtered, washed and dried. The new 2-chloro-5-nitrobenzene-1.4-dicarboxylic acid thus obtained corresponds to the formula

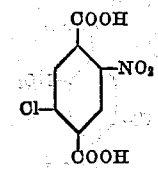

It crystallizes from alcohol of 50% in long nearly colorless needles melting at about 265°.

Example 2

24.5 parts of mono-bromo-terephthalic acid (obtainable by treating 1.4-dimethyl-2-bromo benzene with bromine while exposed to light and saponifying the bromo-terephthalic hexabromide thus formed; see Example 3 of U. S. application Serial No. 318,314, filed November 9, 1928) are dissolved in 125 parts of sulfuric acid mono-hydrate. At about 40° 14 parts of a mixture of nitric and sulfuric acid containing 50% of $HNO_3$ are slowly introduced. The temperature arises to about 48°. Then the mass is gradually heated to 80° and dissolves thereby to a clear solution. From this solution the reaction product separates in the cold and is worked up as described in Example 1. The new 2-bromo-5-nitrobenzene-1.4-dicarboxylic acid thus obtained corresponds to the formula

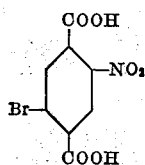

It crystallizes from formic acid in lanceolate leaflets melting at 260–262°.

I claim:

1. A process for preparing 2-halogeno-5-nitrobenzene-1.4-dicarboxylic acids which comprises causing a 2-halogeno-benzene-1.4-dicarboxylic acid to react with a mixture of nitric and sulfuric acid in a sulfuric acid solution.

2. A process for preparing 2-chloro-5-nitrobenzene-1.4-dicarboxylic acid which comprises causing 2-chloro-benzene-1.4-dicarboxylic acid to react with a mixture of nitric and sulfuric acid in a sulfuric acid solution.

3. As new compounds the 2-halogeno-5-nitrobenzene-1.4-dicarboxylic acids of the formula

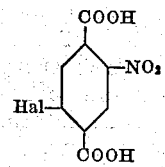

which compounds are nearly colorless crystallized substances, having definite melting points, soluble in organic solvents and in hot water.

4. As a new compound the 2-chloro-5-nitrobenzene-1.4-dicarboxylic acid of the formula,

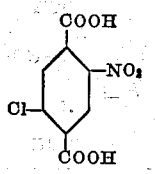

which compound represents when crystallized from dilute alcohol long nearly colorless needles, melting at about 265°, soluble in organic solvents and in hot water.

5. As a new compound, the 2-bromo-5-nitrobenzene-1.4-dicarboxylic acid of the formula:

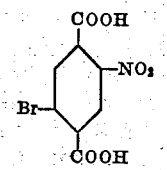

which compound represents when crystallized from formic acid lanceolate leaflets melting at 260° to 262° C., soluble in organic solvents and in hot water.

In testimony whereof, I affix my signature.

HANS SCHINDHELM.